United States Patent [19]

Ito

[11] Patent Number: 4,768,066

[45] Date of Patent: Aug. 30, 1988

[54] COPYING MACHINE

[75] Inventor: Masazumi Ito, Toyohashi, Japan

[73] Assignee: Minolta Camera Kabushiki Kaisha, Osaka, Japan

[21] Appl. No.: 22,978

[22] Filed: Mar. 6, 1987

Related U.S. Application Data

[63] Continuation of Ser. No. 787,970, Oct. 16, 1985, abandoned.

[30] Foreign Application Priority Data

Oct. 17, 1984 [JP] Japan ............................... 59-217560

[51] Int. Cl.[4] ............................................. G03B 27/52

[52] U.S. Cl. ........................................ 355/55; 355/56; 355/57; 355/14 R; 355/8

[58] Field of Search .................................... 355/55–57, 355/14 R, 8

[56] References Cited

U.S. PATENT DOCUMENTS

| | | | |
|---|---|---|---|
| 4,270,173 | 5/1981 | Suttler | 364/523 |
| 4,533,233 | 8/1985 | Kimura et al. | 355/55 |
| 4,543,643 | 9/1985 | Shibukazi et al. | 355/55 |
| 4,575,227 | 3/1986 | Ito et al. | 355/56 |
| 4,582,419 | 4/1986 | Tanaka | 355/55 |
| 4,624,552 | 11/1986 | Asako | 355/55 |
| 4,644,499 | 2/1987 | Shibazaki et al. | 355/55 X |

FOREIGN PATENT DOCUMENTS

| | | |
|---|---|---|
| 58-208758 | 2/1983 | Japan . |
| 59-95526 | 6/1984 | Japan . |
| 59-99459 | 6/1984 | Japan . |
| 59-147358 | 8/1984 | Japan . |
| 59-164565 | 8/1984 | Japan . |

*Primary Examiner*—Michael L. Gellner
*Assistant Examiner*—D. Rutledge
*Attorney, Agent, or Firm*—Price, Gess & Ubell

[57] ABSTRACT

The present invention relates to a copying machine for producing copies of variable magnification. The copying machine displays numerical values of a linear magnification and an area magification. The area magnification is square of the linear magnification. Furthermore the copying machine can be inputted arbitrary numerical values as the linear magnifications and the area magnifications.

9 Claims, 19 Drawing Sheets

COPYING MACHINE

This is a continuation of application Ser. No. 787,970, filed Oct. 16, 1985, now abandoned.

FIELD OF THE INVENTION

The present invention relates to a copying machine, and more particularly to a magnification variable copying machine for producing copies of variable magnification.

BACKGROUND OF THE INVENTION

Presently magnification variable copying machines are proposed which include not only those for producing life-size copies but also copies of specified varying magnifications and those having the function of steplessly varying magnification as desired.

The magnification of these copying machines is expressed as linear magnification which is the ratio of the length of a line after copying to the length of the line before copying. However, when copies are actually handled, for example, for edition or other purposes, the area magnification which is the ratio of an area after copying to the area before copying sometimes appears more convenient than the linear magnification. For instance, when A4 size is to be magnified to A3 size having twice the area of the former, the magnification may be set to a simple value of X2 when in area measurement but needs to be set to X1.414 if it is a linear magnification. Thus, the procedure of setting the magnification to X1.414, although the area is to be magnified twofold, appears awkward and unnatural.

SUMMARY OF THE INVENTION

The main object of the present invention is to provide a copying machine which is adapted to display magnifications in an intelligible manner.

Another object of the present invention is to provide a copying machine which is capable of displaying area magnifications.

Another object of the present invention is to provide a copying machine which is capable of displaying not only linear magnifications but also area magnifications.

To fulfill the above objects, the copying machine of the present invention comprises numerical value input means operable from outside, display means for showing numerical values, memory means for storing numerical values, first control means for feeding a display numerical value to the display means based on the numerical value entered by the input means, mode change-over means for alternatively selecting one of a linear magnification mode wherein the numerical value entered by the input means is handled as a linear magnification and an area magnification mode wherein the entered numerical value is handled as an area magnification, first calculation means for calculating the square root of the display numerical value delivered from the first control means, second control means for causing the memory means to store the display numerical value from the first control means in the linear magnification mode or to store the value calculated by the first calculation means in the area magnification mode, second calculation means for calculating the square of the numerical value stored in the memory means, magnification display request means for requesting the display means to show a magnification corresponding to the value stored in the memory means, and third control means for feeding the value stored in the memory means to the display means in the linear magnification mode or for feeding the value calculated by the second calculation means to the display means in the area magnification mode when the display means is requested by the magnification display request means to show the magnification.

BRIEF DESCRIPTION OF THE DRAWINGS

These and other objects and features of the present invention will become apparent from the following description taken in conjunction with the preferred embodiments thereof with reference to the accompanying drawings, in which.

DETAILED DESCRIPTION OF THE INVENTION

Figure 1:
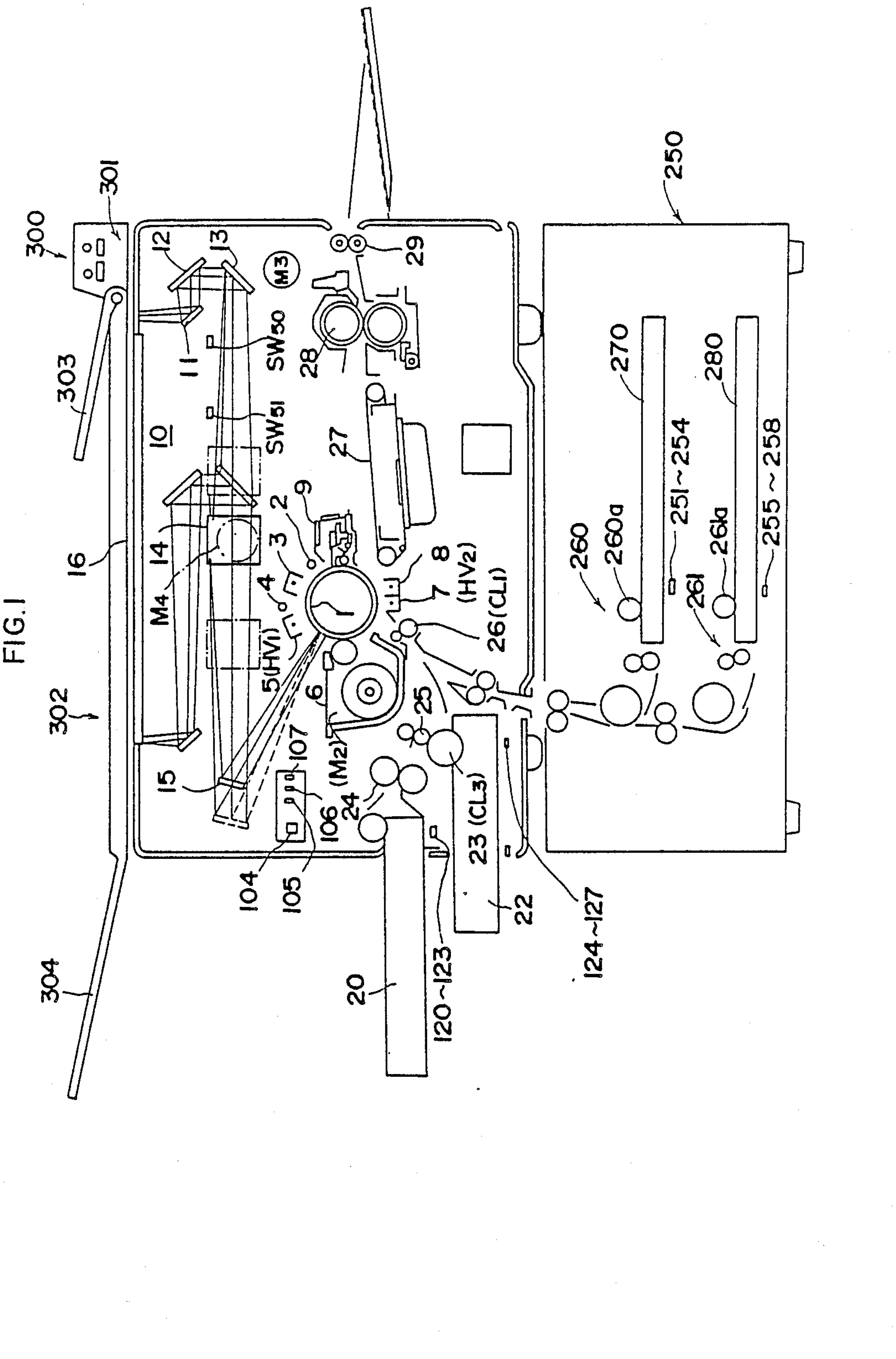
FIG. 1 is a sectional view schematically showing the construction of a copying machine embodying the invention.

Before the description of the present invention proceeds, it is to be noted that like parts are designated by like reference numerals throughout the accompanying drawings.

FIG. 1 shows a copying machine embodying the present invention. A photosensitive drum 1 drivingly rotatable in a counterclockwise direction is disposed approximately in the center of the machine main body. Arranged around the drum 1 are a main eraser lamp 2, subsensitizing charger 3, suberaser lamp 4, main sensitizing charger 5, developing unit 6, transfer charger 7, copy paper separating charger 8 and blade cleaner 9. The drum 1 has a photosensitive surface layer. When passing by the eraser lamps 2, 4 and the sensitizing chargers 3, 5, the photosensitive layer is sensitized and then exposed to an optical image from an optical system 10.

The optical system 10, which is provided below a document support glass plate 16 for scanning an original, comprises an unillustrated light source, movable mirrors 11, 12, 13, lens 14 and mirror 15. When the drum 1 rotates at a peripheral velocity v (which is constant irrespective of magnifications), the light source and the movable mirror 11 travel leftward at a velocity of v/m (where m is a magnification), while the movable mirrors 12 and 13 travel leftward at a velocity of v/2m. These components are driven by a d.c. motor M3 for travel. When the magnification is to be varied, the lens 14 is shifted on its optical axis, and the mirror 15 is shifted and pivotally moved.

The machine main body is provided at its left side with A, B paper feeders 20, 22 having feed rollers 21, 23 respectively. The path of transport of copy paper is provided by pairs of rollers 24, 25, a pair of timing rollers 26, conveyor belt 27, fixing unit 28 and pair of discharge rollers 29.

An auto document feeder (hereinafter referred to as "ADF") 302 is provided as positioned in opposed relation to the upper surface of the document support glass plate 16. Indicated at 300 is an automatic paper selector switch-display combination of the ADF 302, and at 301 is an automatic magnification selector switch-display combination thereof. The copy machine main body has paper code (size) sensor switches 120 to 123 for the A paper feeder 20 and paper code sensor switches 124 to 127 for the B paper feeder 22. In a paper feeder cabinet 25, a C paper feeder 270 is provided with paper code sensor switches 251 to 254, and a D paper feeder 280 has paper code sensor switches 255 to 258.

The ADF 302 installed above the glass plate 16 of the copying machine delivers an original from a tray 304 face down, transports the original to a predetermined position on the plate 16 and stops the original. After the completion of a copying operation, the original is inverted and discharged onto a tray 303. Accordingly, the copying machine and the ADF are so associated with each other that the machine will not be started during the transport of the original and that no original will be transported at least during the scanning of the copying machine.

The paper feeder cabinet 250, which serves also as a support for the copying machine, is internally provided with paper feed mechanisms 260 and 261. In response to an instruction from a microcomputer in the machine main body, one of feed rollers 260*a* and 261*a* is selectively driven. In this case, the paper feed start signal must be emitted with earlier timing than for the feed roller in the machine main body.

Figure 2:
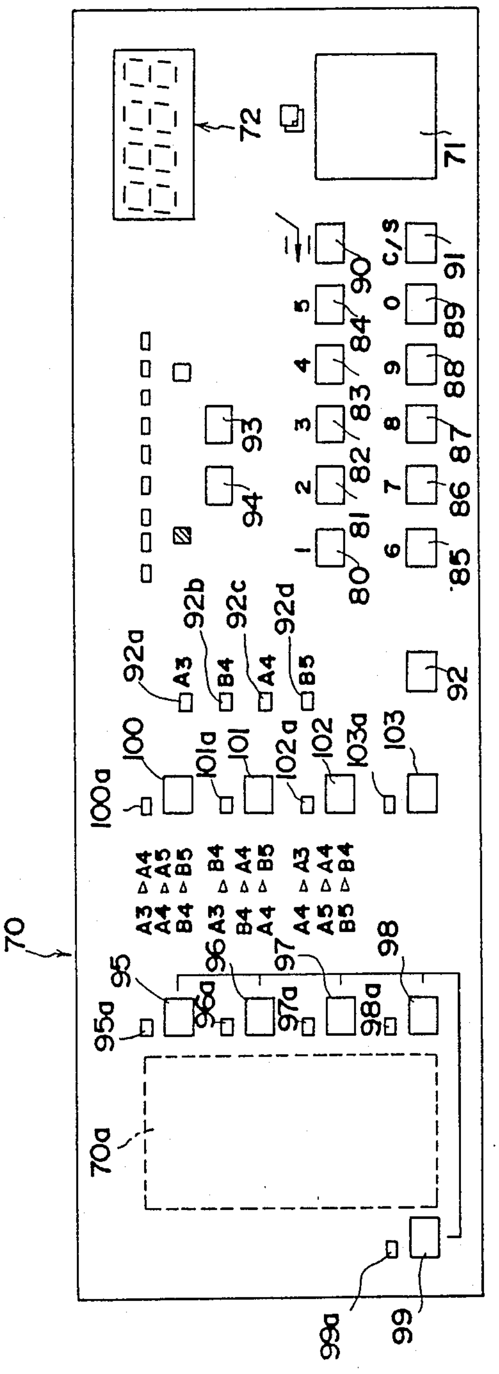
FIG. 2 is a view showing an operation panel.

FIG. 2 shows an arrangement of operation keys on an operation panel 70. The keys arranged on the panel 70 include a print key 71 for starting a copying operation, a numerical value display 72 for displaying four-digit numerical values, ten keys 80 to 89 for the numerical values of 1, 2, . . . , 9, 0, respectively, an interrupt key 90 for specifying an interrupt copying operation, a clear/stop key 91, paper selector keys 92 each for specifying one of the sizes of copy paper provided in a multiplicity of stages, up and down keys 93 and 94 for specifying one of stepwise varying copy image densities, groups of keys 95 to 103 associated with means for setting magnifications, etc.

The first group of magnification selector keys 95, 96, 97 and 98 is provided for optionally setting a magnification. When one of these keys is depressed after the control mode of the copying machine has been changed to a first magnification setting mode by manipulating a key 99 for selecting this mode, the numerical value keyed in by the ten-key arrangement and shown on the display 72 is stored as a magnification in a memory corresponding to the depressed key. A pilot lamp 99*a* indicates that the machine is in the optional magnification setting mode.

The second group of magnification selector keys 100, 101, 102 and 103 is provided with corresponding memories each having a magnification preset therein, such that a copying operation can be conducted at the preset value without setting a numerical value as needed for the first key group. The magnifications to be preset are those which appear generally useful for a particular destination and are selected, for example, before the delivery of the machine from the factory. This will be described later in detail.

Thus, the first key group is used for the user to set the desired magnification, while the second key group is intended for common use. The two groups therefore serve different functions. For example, when specified for the DIN standard, the keys of the latter group are preset to the magnifications corresponding to A4→B5, B4→A4, A3→A4 and A4→A3. However, since the values preset for the second key group are common or calculated magnifications, the magnification of copies actually obtained could be slightly different from the corresponding preset value owing to a mechanical or design error. For instance, even if a magnification of X1 is selected, the actual magnification could be X1.004 or X0.996. In such a case, the desired magnification can be obtained by manipulating a key 104 shown in FIG. 1 for selecting a second magnification setting mode to change the control mode of the machine to this mode, and setting an optional value in the memory for the key concerned of the second group 100 to 103 by the same procedure as in the first magnification setting mode. For example, a value of 1.002 or 0.998 is settable for the X1 key.

In practice, the magnification mentioned is either a linear magnification or area magnification, which is selected by a magnification mode change-over switch 107 shown in FIG. 1. The magnification shown on the display 72 is an area magnification when the switch 107 is on, or a linear magnification when the switch 107 is off.

Figure 3:
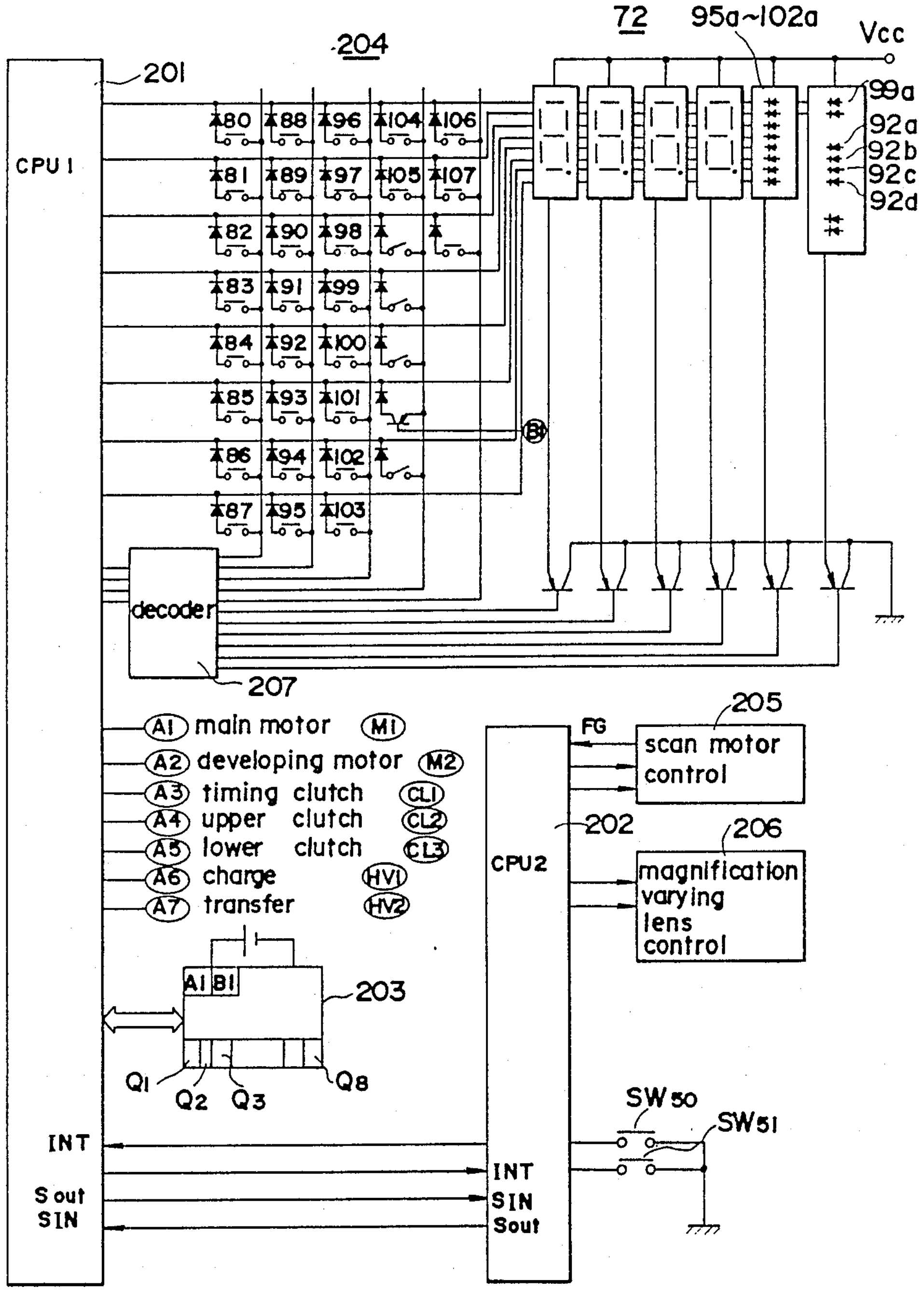
FIG. 3 is a diagram showing a control circuit.

FIG. 3 shows a control circuit for use in the copying machine of the present invention. Indicated at 202 is a second CPU for controlling the optical system. A first CPU 201 controls the second CPU 202 which is connected to the CPU 201 via interrupt terminals INT and data input and output terminals Sin and Sout. The control circuit further includes a battery backed-up RAM 203, switch matrix 204, drive circuit 205 for the d.c. motor M3 for scanning originals, drive circuit 206 for a stepping motor M4 for giving varying magnifications and decoder 207. The first CPU 201 has output terminals A1 to A7 connected to drive switching transistors (not shown) for a main motor M1, developing motor M2, timing roller clutch CL1, upper paper feed clutch CL2, lower paper feed clutch CL3, charger 5 and transfer charger 7, respectively.

Various items of data for controlling copying operation are written in the RAM 203, or data transferred from a ROM in the CPU is stored therein. The RAM 203 has memories Q1, Q2, Q3 and Q4 corresponding to the selector keys 100 to 103. For example, when the selector key 100 is depressed, a magnification on the display 72 is written in the memory Q1 or read out, while when the selector key 101 is depressed, the magnification concerned is written in or read out from the memory Q2, as will be described in detail later.

Similarly, memories Q5, Q6, Q7 and Q8 are provided for the selector keys 95 to 98, such that when the selector key 95 is depressed, a magnification is written in or read out from the memory Q5.

FIGS. 4 to 13 are flow charts showing the processing procedures to be executed by the first CPU for setting magnifications and controlling copying operation.

Figure 4:
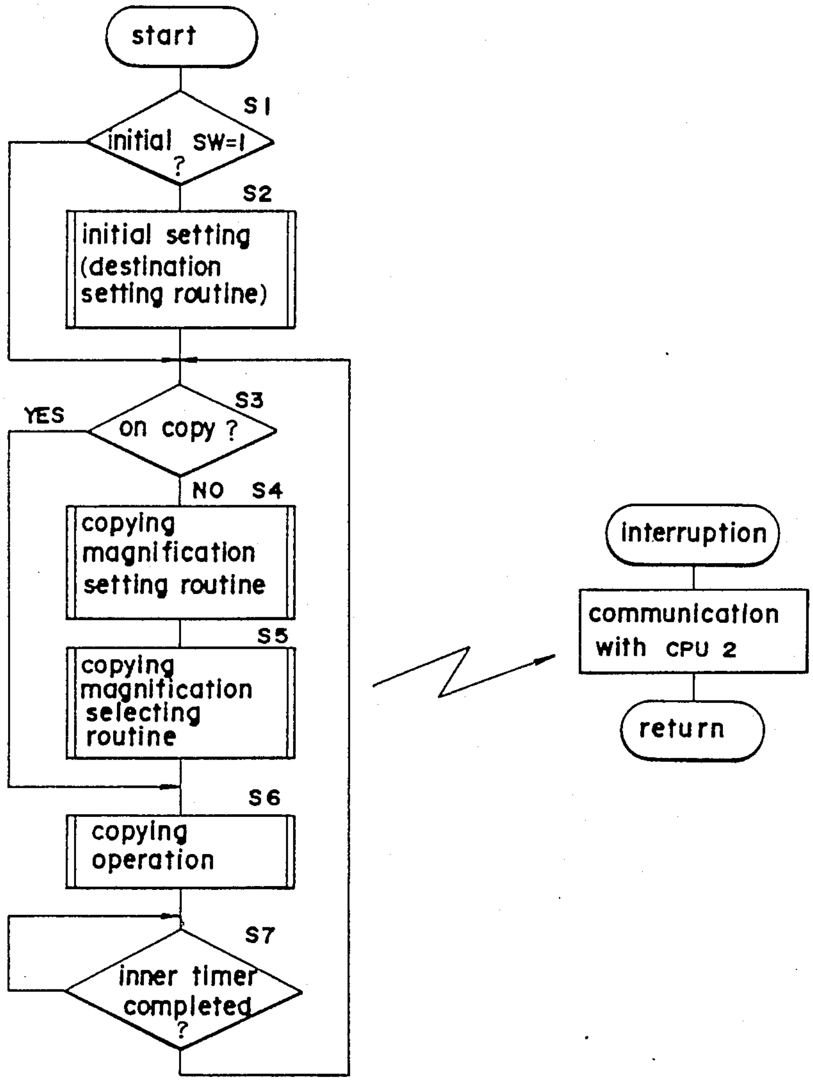
FIGS. 4 to **13*b*** are flow charts showing the processing procedures to be executed by a first CPU for setting magnifications and controlling copying operation.

FIG. 4 is a flow chart generally briefly showing the processing procedures to be executed by the first CPU.

Communications are performed between the first CPU 201 and the second CPU by interruption. The data to be transmitted between the first and second CPU's 201, 202 includes scanning instructions for the optical system, scan sizes, copy magnifications, timing signals, return signals and position signals.

Steps S1 and S2 are executed while the machine is assembled or prepared for delivery from the factory to set magnifications in the memories Q1 to Q4. This process is shown in detail in FIG. 5.

Figure 6:
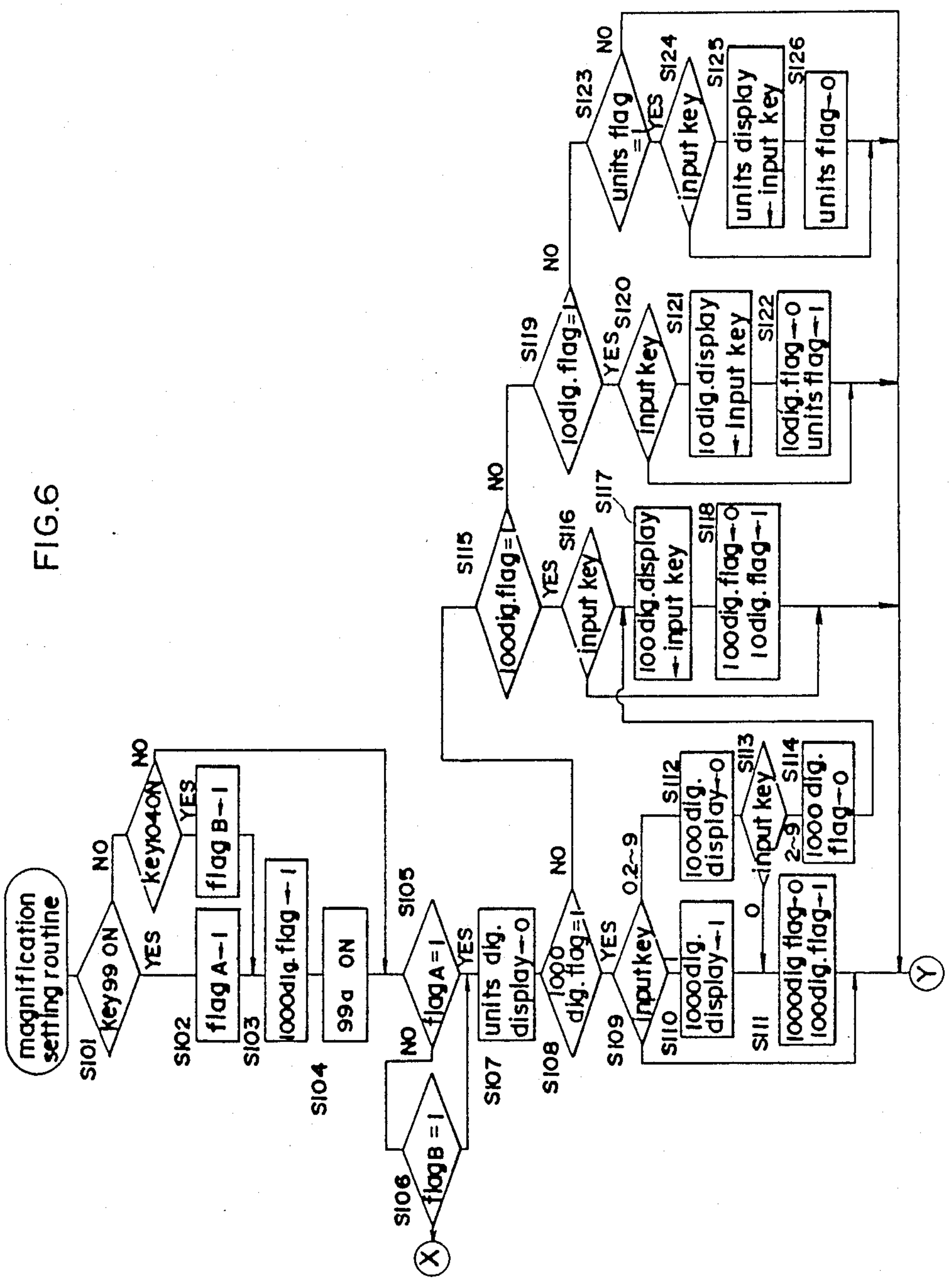
Figure 7:
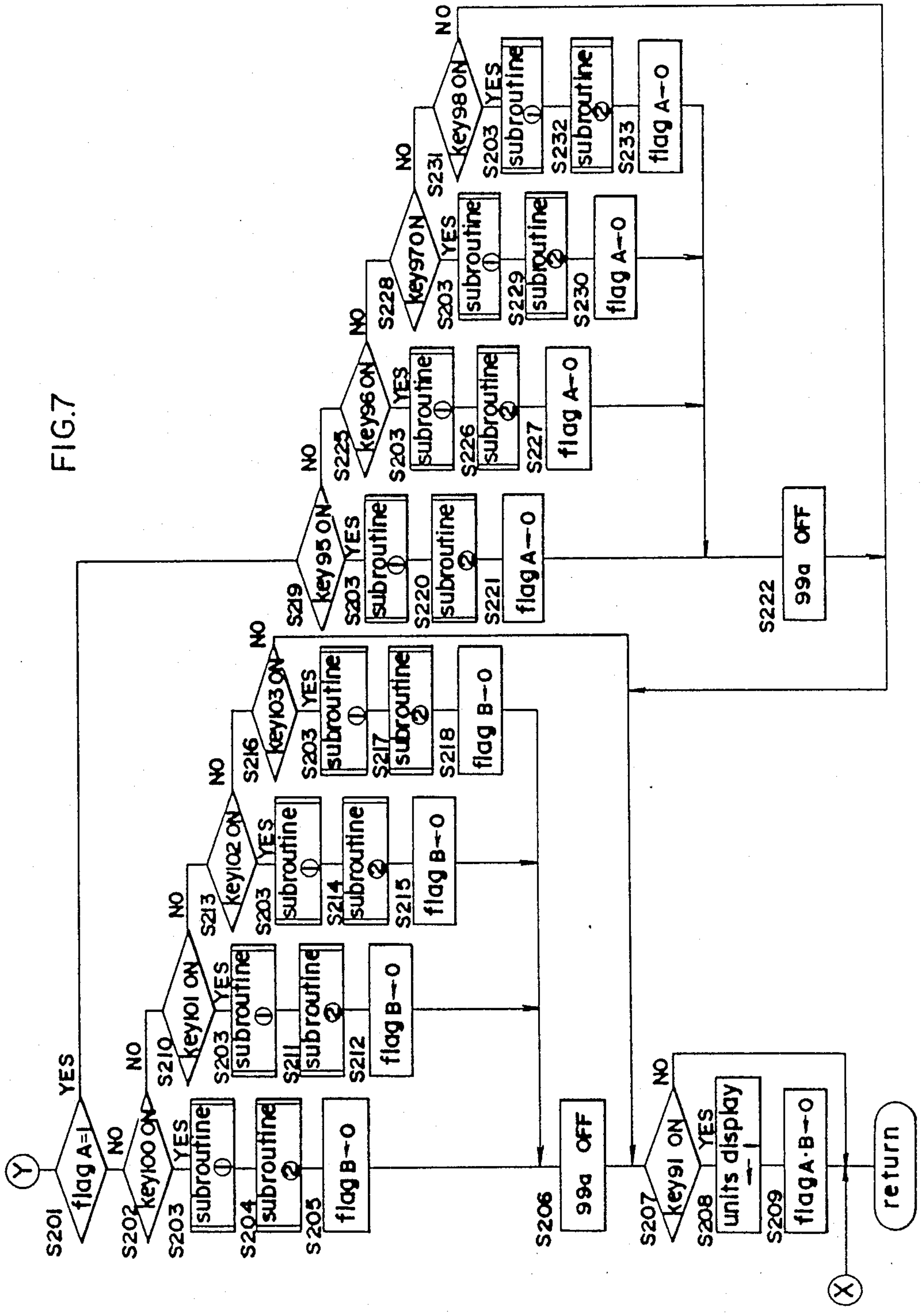
Figure 8:
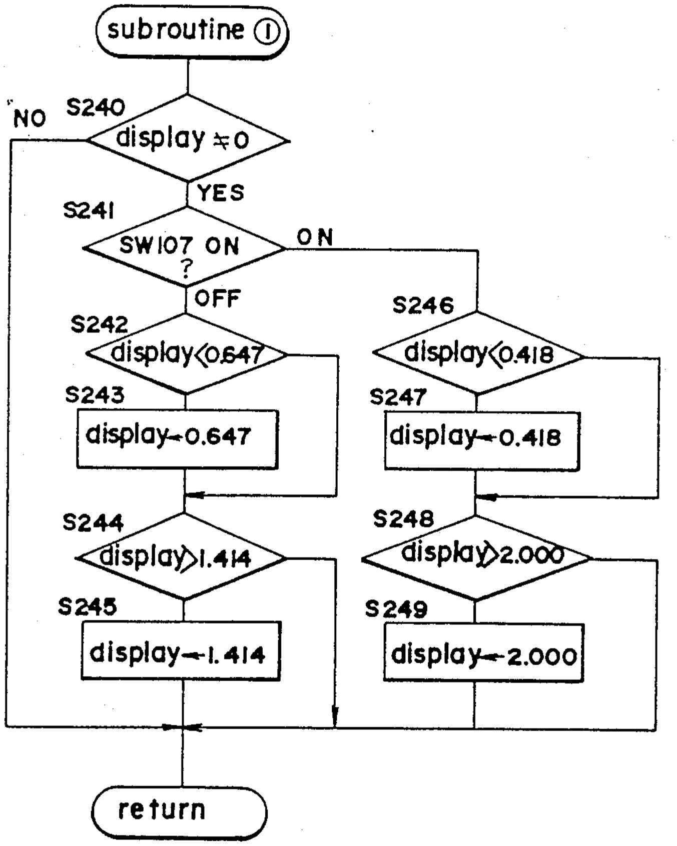

When the copying machine is found to be out of operation in step S3, step S4 is performed to set magnifications in the memories Q5 to Q8 or Q1 to Q4 for the selector keys 95 to 98 or 100 to 103, respectively. FIGS. 6 to 8 show this process in detail.

Step S5 transfers to the second CPU 202 data for controlling the lens position and motor drive speed in corresponding relation to the magnifications set in step S4. The second CPU 202 handles the transferred data by interruption. FIGS. 10 and 11 show step S5 in detail.

Step S6 executes a process for controlling copying operation. FIG. 13 shows this process in detail, while FIG. 14 is a time chart for the process.

Figure 5:
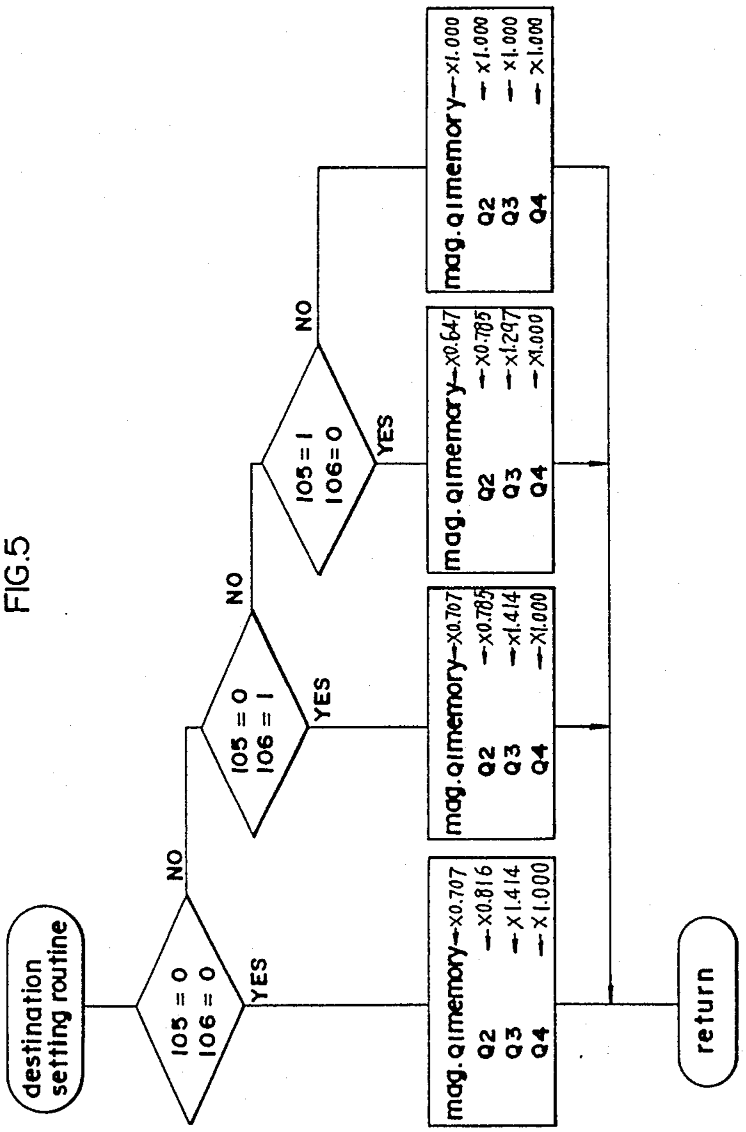

FIG. 5 is a flow chart showing in detail an initial setting process for presetting predetermined numerical values in the memories Q1 to Q4 corresponding to the second group of magnification selector keys 100 to 103. The key 104 serves as the initial switch shown in FIG. 4 for step S1. It is so positioned within the machine that it is not accessible usually but is accessible only during assembly at the factory or by the serviceman. Only when this switch 104 is manipulated, the process of FIG. 5 is executed.

The numerical values to be preset in the memories Q1 to Q4 are determined by turning on and off switches 105 and 106 shown in FIG. 1. More specifically, predetermined values are preset in the memories Q1 to Q4 by the worker during assembly or in the delivery stage at the factory by turning on and off the switches 105 and 106 according to combinations predetermined for the contemplated destination or the like and closing the initial switch 104.

Table 1 shows examples of preset values determined by on-off combinations of the switches 105 and 106.

TABLE 1

| Switch | | Magnification | | | |
|---|---|---|---|---|---|
| 105 | 106 | Q1 | Q2 | Q3 | Q4 |
| 0 | 0 | 0.707 | 0.816 | 1.414 | 1.000 |
| 0 | 1 | 0.707 | 0.785 | 1.414 | 1.000 |
| 1 | 0 | 0.647 | 0.785 | 1.297 | 1.000 |
| 1 | 1 | 1.000· | 1.000 | 1.000 | 1.000 |

The values be preset in the memories Q1 to Q4 are linear magnifications irrespective of the state of the magnification mode change-over switch 107. This is also the case with the values to be preset in the memories Q5 to Q8. As will be described later, the values stored in the memories Q1 to Q8 are shown on the display 72, directly as linear magnifications or as converted to area magnifications.

When numerical values are to be set as magnifications in the memories Q1 to Q8 for the selector keys 100 to 103 and 95 to 98, the procedures shown in FIGS. 6 to 8 are executed.

With reference to steps S101 and S102 shown in FIG. 6, when the key 99 or 104 is depressed to set the machine in one of the magnification setting modes, which of the first and second key groups is request for magnification setting is judged. When the key 99 is depressed, the machine is in the first magnification setting mode, and flag A is set to "1". Upon depression of the key 104, "1" is set for flag B which represents the second magnification setting mode.

When either the key 99 or the key 104 is depressed, 1000 digit position flag is set to "1" in step S103, the pilot lamp 99*a* indicating the magnification setting mode is turned on in step S104, and the units indicator of the display 72 shows "0" in step S107. Thus, when the control mode of the copy machine is changed to the magnification setting mode, the display 72 shows "bbb0" (b stands for blank) and is made ready to accept inputs, first at the 1000 digit position.

When the ten-key arrangement is manipulated in this state, the key depressed is identified in step S109. Only when it is "1" key 80, step S110 follows to show "1" in the 1000 position. To assure convenience in connection with the display 72, the numerical values to be entered will be described with reference to the digit positions of 1000 position, 100 position, 10 position and units position. However, the values as magnifications are handled as decimal numbers having three decimal places and four significant figures.

When the keyed-in input is a value of 0 or 2 to 9 with the 1000 position flag set to "1", the sequence proceeds to step S112, in which "0" is shown in the 1000 position. Subsequently, when the input is "0", as well as when it is "1", step S111 follows, in which the 1000 position flag is changed to "0" and 100 position flag to "1" to wait for an input to the 100 position. If the input is 2 to 9, the 1000 position flag is set to "0" in step S114, followed by step S117 to show the input value in the 100 position.

The foregoing procedure followed when the 1000 position flag is "1" is subject to the condition that the values within the range of 0.647 to 1.414 are to be handled as effective magnifications. Accordingly, "1" or "0" only can be displayed in the 1000 position. This assures a facilitated keying-in procedure for entering "0" in the 1000 position. However, even if the above procedure is followed, it is likely that the magnification value obtained will be outside the effective range, depending on the value to be keyed in for the 100 position and lower digit positions. The steps to be taken in such an event will be described when the subroutines of FIGS. 7 and 8 are described.

After a value has been entered for the 1000 position, the 100 position flag is set to "1". Upon manipulation of the ten-key arrangement in this state, the value corresponding to the key depressed for the 100 position is entered. Step S117 displays the value, and step S118 changes the 100 position flag to "0" and 10 position flag to "1". Subsequently, the ten-key arrangement is similarly manipulated to key in an input in the 10 position and an input in the units position.

FIG. 7 is a flow chart showing a process by which the value entered and displayed by the process of FIG. 6 is stored in the memory corresponding to the selector key which is subsequently depressed.

Step S201 checks whether the machine is in the first or second magnification setting mode. Since step 201 is performed only when either the flag A or the flag B is "1", this step checks, for example, only whether the flag A is "1". If the flag A is "1" which indicates the first magnification setting mode, the sequence proceeds to steps S219 et seq. for checking the manipulation of the first group of selector keys 95 to 98. If the flag A is not "1", i.e., if the flag B is "1" which indicates the second magnification setting mode, steps S202 et. seq. follow for checking the depression of the second group of selector keys 100 to 103.

In whichever manipulation setting mode, the process of FIG. 7 is executed to store the displayed value in the memory corresponding to the manipulated key. As already mentioned, however, a value outside the allowable magnification range could be on display in this state. In the process of FIG. 7, therefore, the identification of the manipulated key is followed by a subroutine (1) designated by step S203 so that an unallowable value will not be displayed. FIG. 8 shows step S203 in detail.

With reference to FIG. 8, step S241 checks the state of the magnification mode change-over switch 107. When it is off, indicating the linear magnification mode, step S242 judges whether the displayed value is smaller than 0.647. If it is smaller, step S243 displays 0.647. Further step S244 checks whether the displayed value is greater than 1.414. If it is greater, step S245 displays 1.414. On the other hand, if the magnification mode change-over switch 107 is on, indicating that the machine is in the area magnification mode, step S246 checks whether the displayed value is smaller than 0.418. If it is smaller, step S247 displays 0.418. Further step S248 checks whether the displayed value is greater than 2.000. If it is greater, step S249 displays 2.000. The values 0.418 and 2.000 are area magnifications as converted from the linear magnifications of X0.647 and X1.414, respectively. Thus, the corresponding values are the same magnification in practice.

Figure 9:
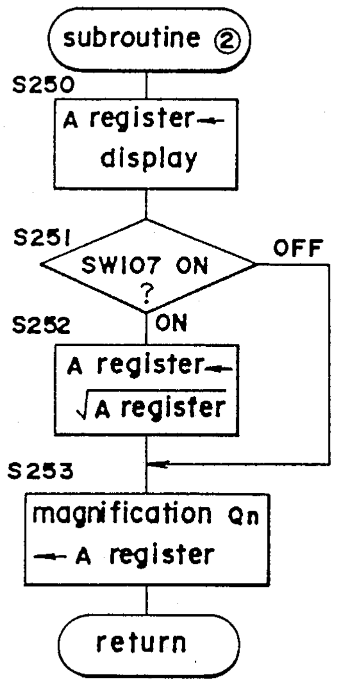

In connection with FIG. 7, when a specified selector key is manipulated in the magnification setting mode, the value on display, if outside the allowable range, is converted to an allowable limit value and then stored in the corresponding one of the memories Q4 to Q8 according to the subrountine (2) of step S204. FIG. 9 shows the procedure of step S204.

With reference to FIG. 9, the displayed value is temporarily held in a register A in step S250. Step S251 checks the state of the magnification mode change-over switch 107. If it indicates the area magnification mode, the square root of the value held in the register A is held in the register A in step S252, and the value held in the register A is stored in the corresponding one of the memories Q4 to Q8 in step S253. On the other hand, if the machine is in the linear magnification mode, the displayed value is directly stored in the memory.

By the process of the subroutine (2), the displayed value is stored as it is in the memory when the machine is in the linear magnification mode, or the displayed value is converted to its square root, i.e., to the corresponding linear magnification, and then stored in the memory when in the area magnification mode. Thus, the linear magnification is stored in the memory irrespective of the magnification mode.

Referring to FIG. 7 again, after the displayed value has been stored in the memory in step S204, the flag A is changed to "0" and step S222 follows in the case of the first magnification setting mode. In the case of the second magnification setting mode, the flag B is changed to "0", followd by step S206.

After the key in the second magnification selector group 100 to 103 has been depressed in the second magnification setting mode, the pilot lamp 99*a* indicating the optional magnification setting mode is turned off in step S206, which is followed by step S207. Further after the key in the first group 95 to 98 has been depressed in the first magnification setting mode, the pilot lamp 99*a* is turned on in step S222, followed by step S207. Thus, the pilot lamp 99*a*, which indicates the optional magnification setting mode, is turned off on completion of magnification setting for the selector key.

Steps S207 to S209 are executed when the clear/stop key 91 (see FIG. 2) is depressed. Upon depression of the key 91, the display 72 shows "bbb1" and the flags A and B are turned to "0" in steps S208 and S209. Thus the clear/stop key 91, when depressed, clears the value on the display and cancels the magnification setting mode. Accordingly, the value "1" now shown is the number of copy as the standard set value.

Figure 10A:
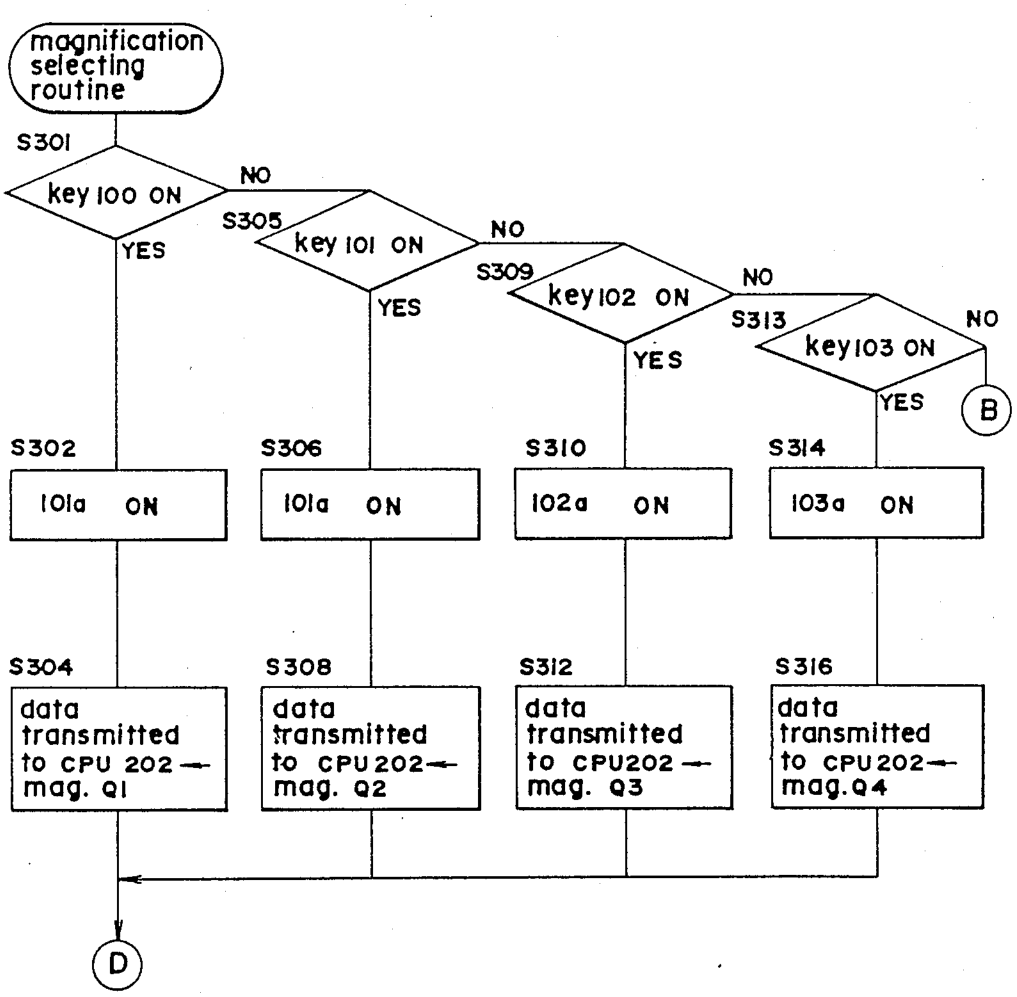
Figure 10B:
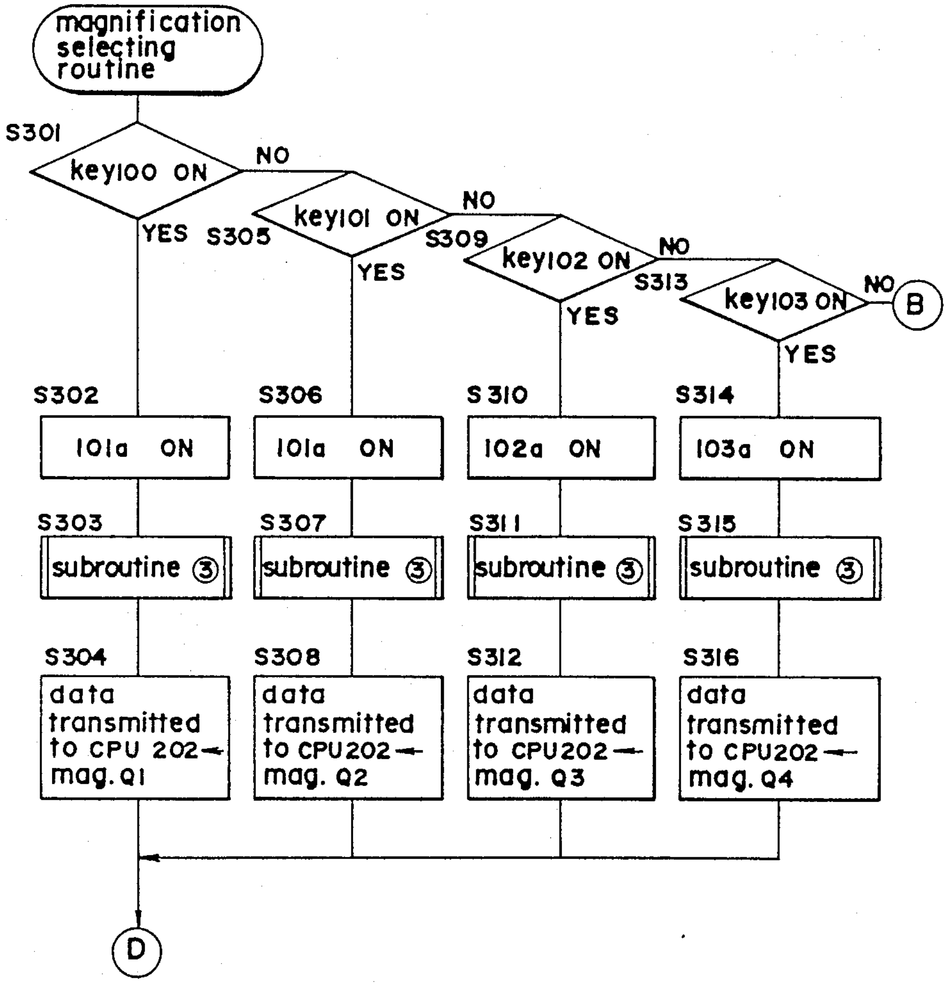
Figure 11:
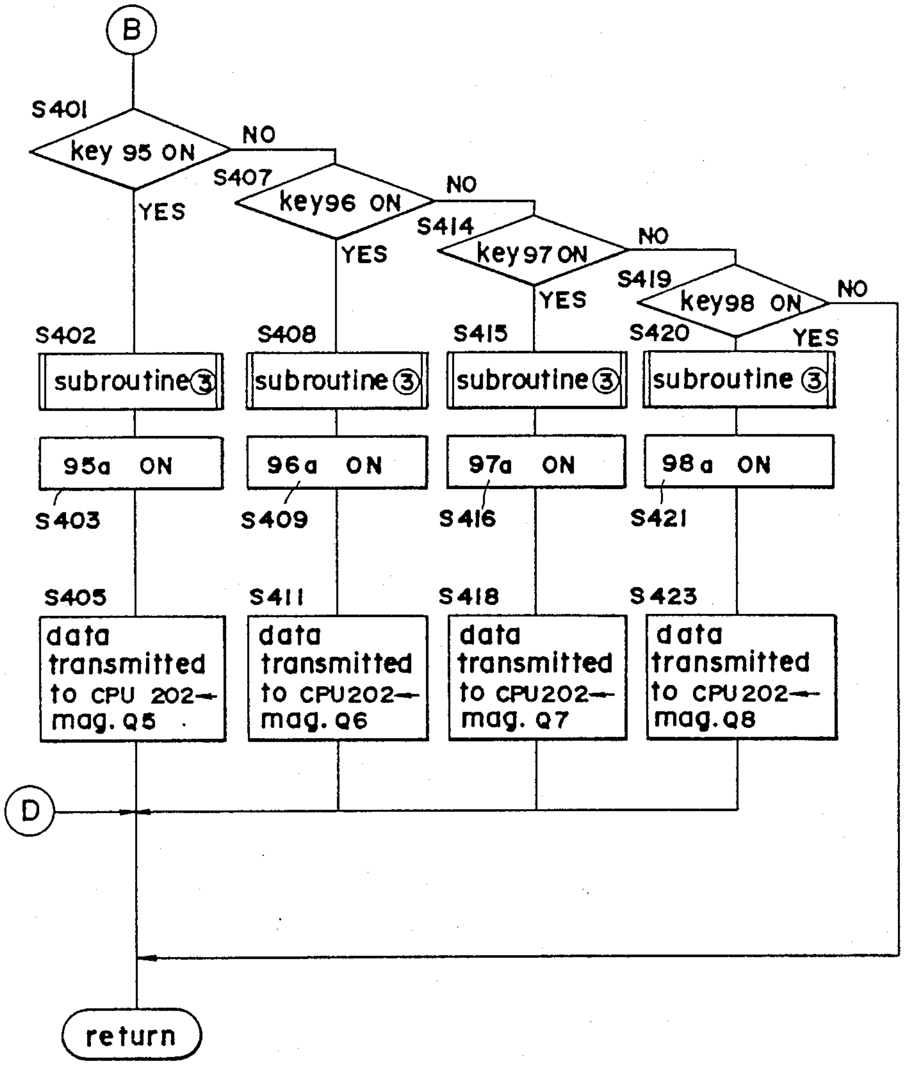

FIGS. 10*a* and 11 respectively show the processes to be excecuted when the selector key in the second group 100 to 103 and the selector key in the first group 95 to 98 are depressed.

With reference to FIG. 10*a*, one of the keys 100, 101, 102 and 103, when depressed, turns on the corresponding one of light-emitting diodes 100*a*, 101*a*, 102*a* and 103*a* (see FIG. 2) provided for these keys, and the value stored in the memory is then transferred to the second CPU 202 as magnification data.

When one of the selector keys 95 to 98 is depressed in FIG. 11, the corresponding light-emitting diode is turned on as in the above case. Since the key is used for the optional magnification setting, the value stored in the corresponding one of the memories Q5 to Q8 by a subroutine (3) designated by step S402, S408, S415 or S420 is shown on the display 72. This display is given, for example, only while the key is being depressed, such that when the key is released, the display shows the copy number retrieved from other memory device. The value stored in the memory is transferred to the second CPU 202 as magnification data.

Figure 12:
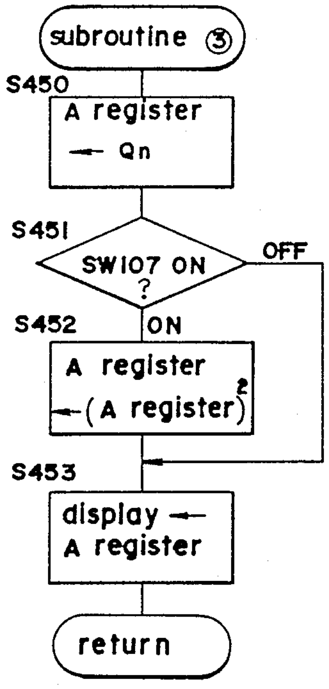

FIG. 12 shows the subroutine (3). In step S450, the value stored in the memory is retrieved by the register A, and the magnification mode is identified by step S451. When the sequence is in the area magnification mode, the value in the register A is squared and held in the register A in step S452, and the squared value is displayed in step S453. On the other hand, the value in the register A is directly displayed in the linear magnification mode.

By the above procedure, the linear magnification value in the memory (Q5 to Q8) is displayed as squared to an area magnification in the area magnification mode, or the value is displayed directly as a linear magnification in the linear magnification mode.

When the selector key in the first group 95 to 98 is depressed, the magnification may be shown on the display 72 in the same manner as when the selector key in the second group 100 to 103 is depressed. More specifically stated with reference to FIG. 10*b*, when one of the selector keys 100 to 103 is manipulated, the subroutine (3) is executed in step S303, S307, S311 or S315 to display the value as stored in the memory when in the linear magnification mode or as squared to an area magnification when in the area magnification mode.

In corresponding relation to the magnification value thus set, the lens 14 is shifted under the control of the drive circuit 206 according to an output from the second CPU 202. For this purpose, the stepping motor M4 is controlled in both forward and reverse directions so that it rotates by one pitch for a value of 0.001 or 0.002. In practice, therefore, the magnification is variable almost steplessly. Further the velocity of travel of the optical system is controlled by the drive circuit 205 according to an output from the second CPU 202 so as to be variable with the set value. This will not be described in detail since various systems have heretofore been proposed or provided for controlling the speed of the drive source, i.e., the d.c. motor.

FIG. 2 shows adjacent to the first selector key group 95 to 98 a panel portion 70*a* which comprises a white board on which characters can be written erasably by a specified writing implement, a removable adhesive sticker, or a panel which is removably attached magnetically. The user can then write on the panel portion 70*a* characters, such as "legal size→letter size", indicating the use of an optionally set magnification value. This assures convenient use. The panel portion 70*a* may be recessed or raised from the other panel portion when so required.

Figure 13A:
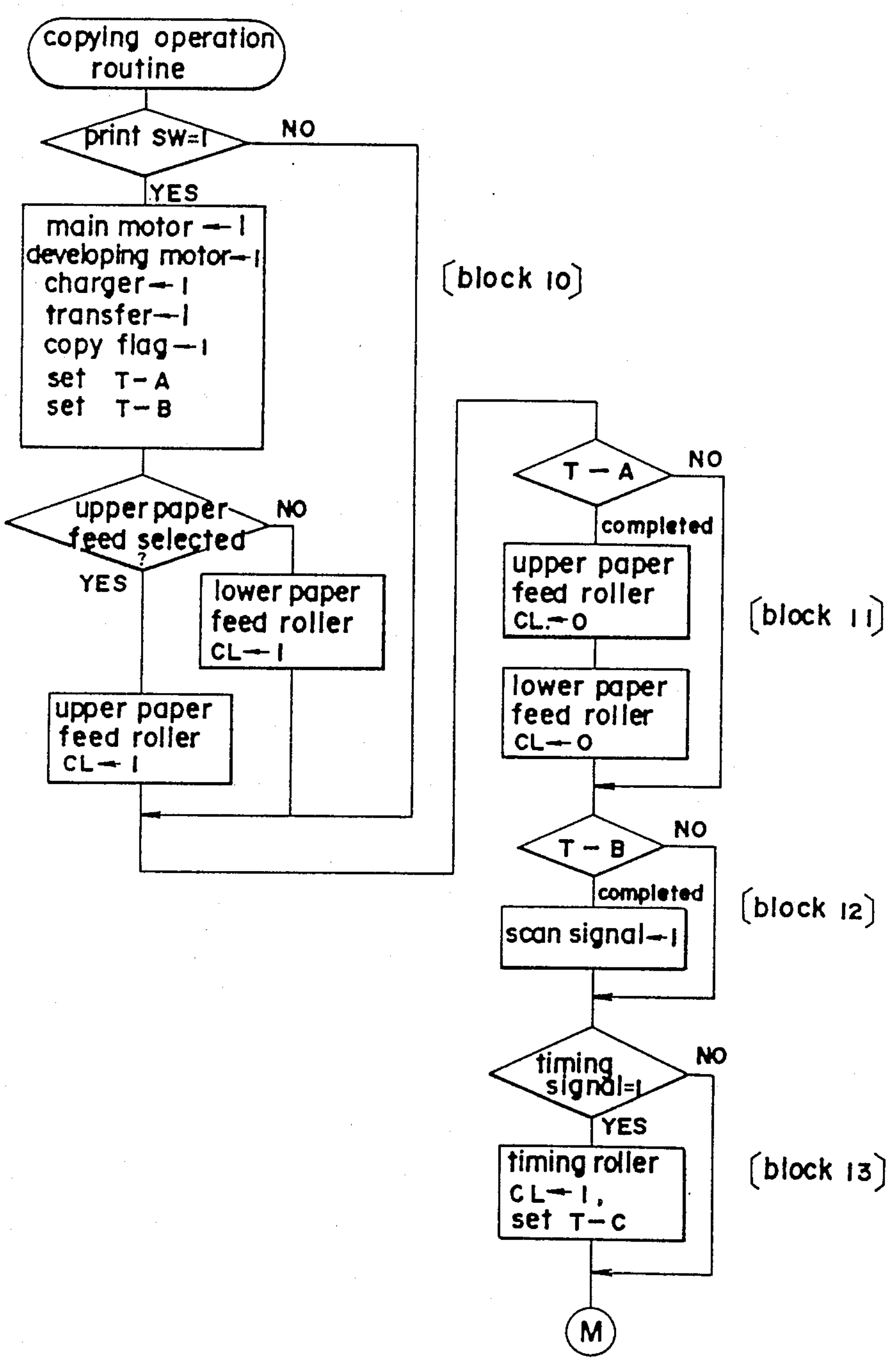
Figure 13B:
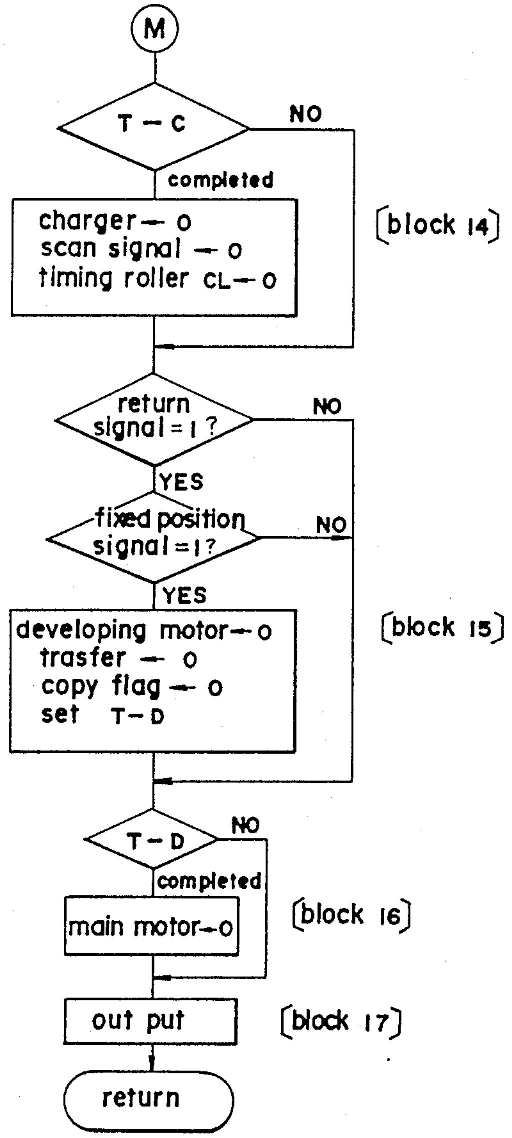
Figure 14:
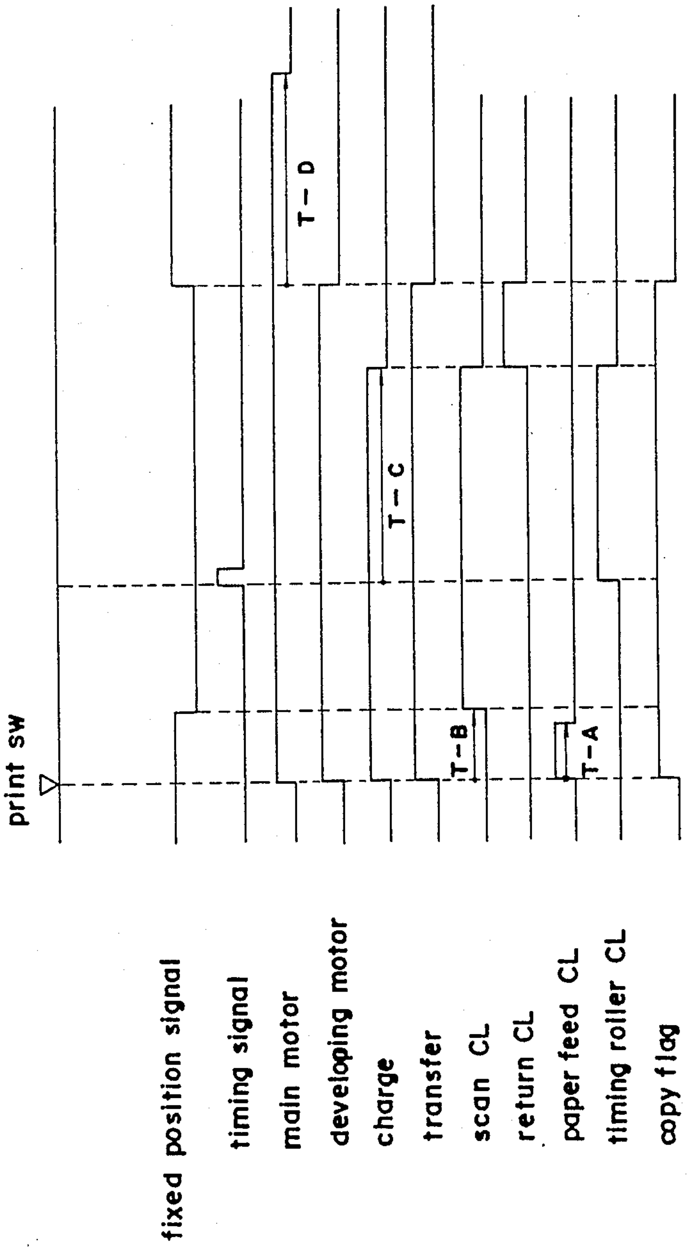
FIG. 14 is a waveform diagram illustrating the main steps of copying operation shown in FIG. 13.

FIGS. 13*a*, 13*b* are flow charts showing an exemplary mode of controlling the copying operation of the machine. The control mode will be described briefly with reference to the time chart of FIG. 14.

In block 10, the print switch is turned on, energizing the main motor M1, developing motor M2, sensitizing charger 5 and transfer charger 7, a copy flag is set to "1" to indicate that the machine is in copying operation, control timers T-A and T-B are started, and the clutch for the paper feed roller selected is actuated.

In block 11, the lapse of time set on the timer T-A is detected, whereupon the paper feed roller clutch is turned off.

In block 12, the lapse of time set on the timer T-B is detected to turn on the scan motor M3 and initiate a scan movement.

In block 13, a timing signal is emitted during the scan movement, whereupon the timing roller clutch CL1 is turned on and a timer T-C is set. A sheet of copy paper is fed by the timing rollers 26 as timed with the image on the drum 1.

In block 14, the time set on the timer T-C is detected to turn off the charger 5, scan motor M3 and timing roller clutch CL1. The timer T-C may be set variably, for example, according to the size of copy sheet used.

When a home position switch is turned on by the return of the optical system to the specified position in block 15, the developing motor M2 and the transfer charger 7 are turned off, the copy flag is changed to "0", and a timer T-D is set.

In block 16, the lapse of time set on the timer T-D is detected, whereupon the main motor M1 is de-energized. Block 17 includes steps of giving various outputs.

The timers T-A to T-D mentioned with reference to the flow chart and time chart are digital timers which are so programmed as to count up "1" for every processing routine of the first CPU-201 to be executed within a period of time determined by an internal timer. The period of time set on the timer is stored as numerical data.

Although the magnification memories Q5 to Q8 are selected by the corresponding selector keys 95 to 98, respectively, according to the embodiment described, one selector key may be used for selecting the memories Q5 to Q8 one after another every time the key is manipulated. In this case, the calculated value may be stored in the selected memory by manipulating a memory key provided for this purpose.

Figure 16:
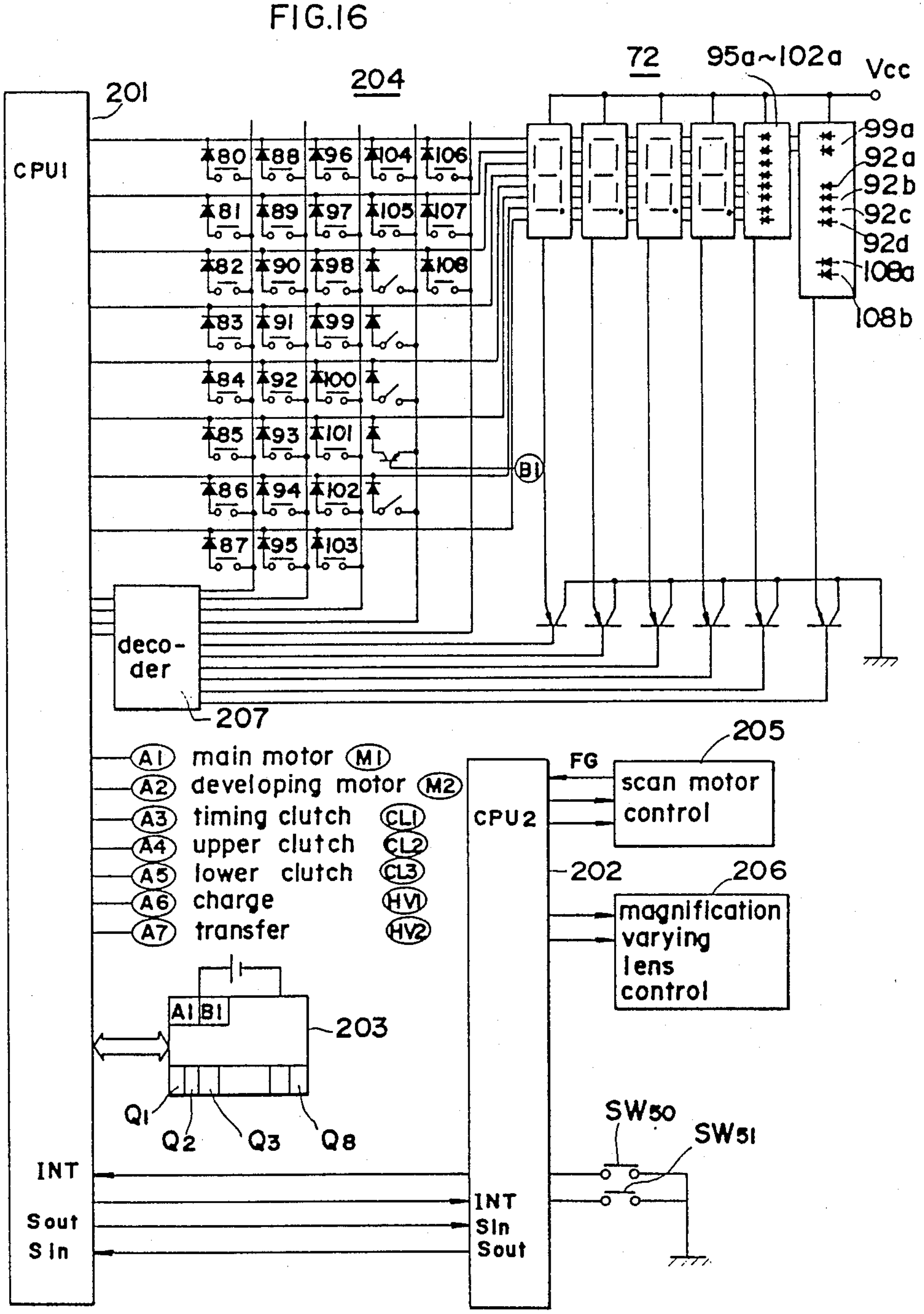
Figure 17:
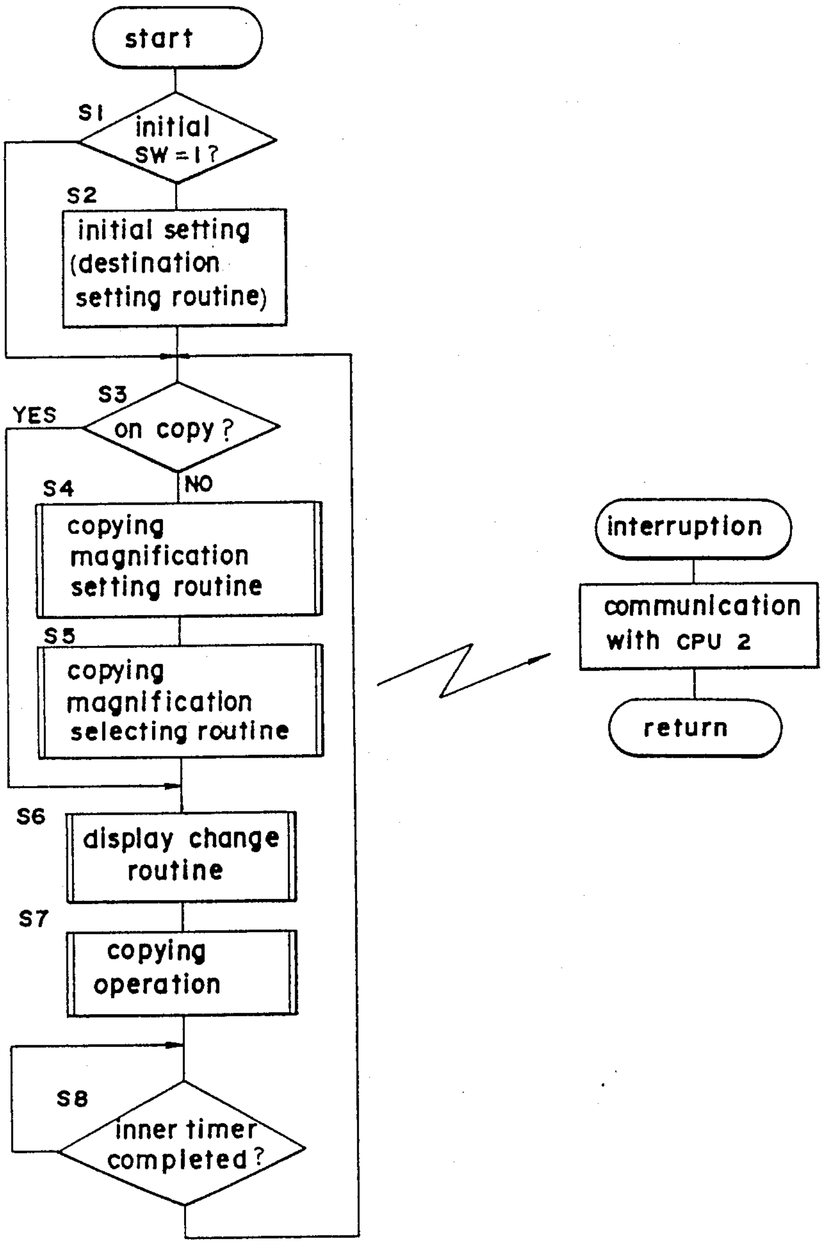
Figure 18:
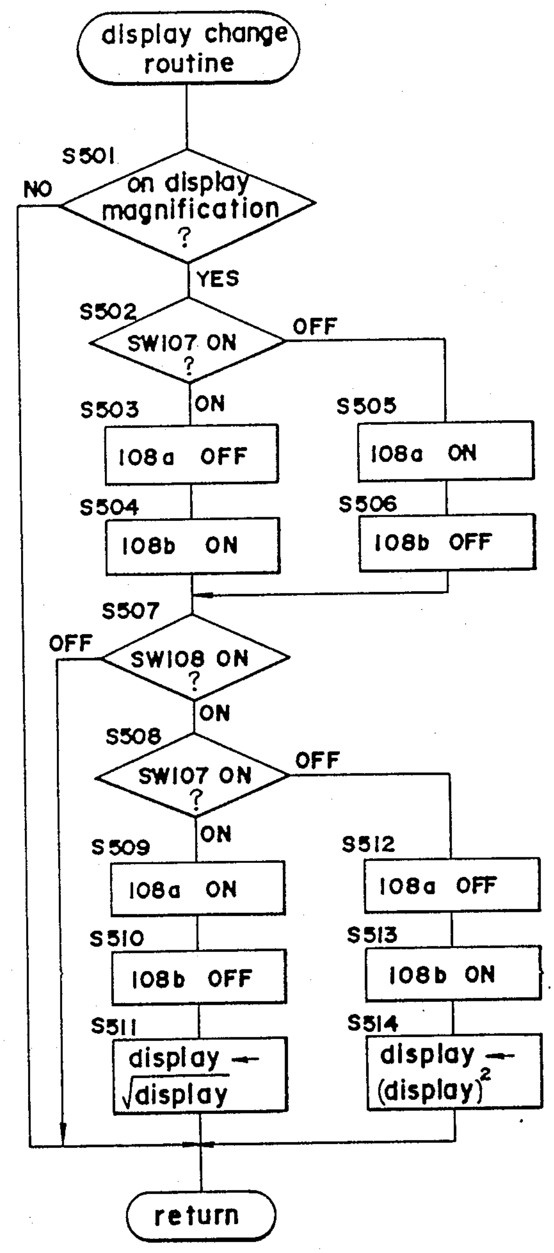

FIGS. 16 to 18 show a second embodiment of the present invention, which will be described with reference to these drawings. The parts common to the first and second embodiments are each referred to by the same corresponding numerals and will not be described.

Figure 15:
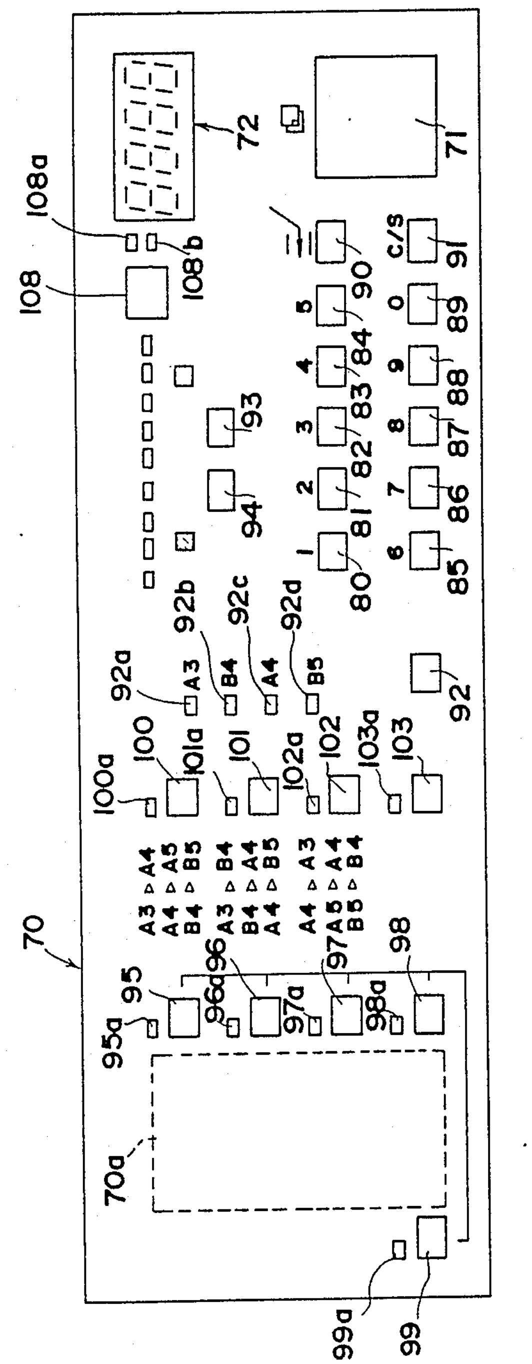
FIGS. 15 to 18 show a second embodiment, FIG. 15 being a view showing an operation panel, FIG. 16 being a diagram showing a control circuit, and FIGS. 17 and 18 being flow charts showing the main processing procedures to be executed by a first CPU.

FIG. 15 shows an operation panel 70. Provided adjacent to a display 72 are a display change key 108 for changing the mode of magnification shown on the display 72, and pilot lamps 108*a* and 108*b* for indicating the mode of the magnification on the display.

When the magnification mode is linear magnification mode, the pilot lamp 108*a* goes on, indicating the linear magnification mode, and a linear magnification is shown on the display 72. When the display change key 108 is depressed at this time, an area magnification converted from the linear magnification on the display 72 is shown. At the same time, the pilot lamp 108*a* is turned off, and the display lamp 108*b* is turned on, indicating the area magnification mode. If the display change key 108 is released, the original linear magnification is resumed on the display 72.

FIG. 16 shows a control circuit. The switch matrix 204 has the display change key 108, while the pilot lamps 108*a* and 108*b* are connected to the decoder 207.

FIG. 17 is a flow chart generally showing the processing procedures to be followed by the first CPU.

Step S6 shows numerical values on the display 72 and controls the pilot lamps 108*a* and 108*b* based on the manipulation of the display change key 108. FIG. 18 shows this step in detail.

With reference to FIG. 18, step S501 checks whether a magnification is shown on the display 72. If it is on display, the following process of the present routine is executed, whereas if otherwise, the sequence returns.

Step S502 checks whether the current mode is area magnification mode or linear magnification mode. When it is the area magnification mode, the pilot lamp 108*a* is turned off in step S503, and the pilot lamp 108*b* is turned on in step S504, while if the current mode is the linear magnification mode, the pilot lamp 108*a* is turned on in step S505, and the pilot lamp 108*b* is turned off in step S506.

Step S507 checks whether the display change key 108 is in its depressed state. Only when it is in the depressed state, steps S508 to S514 follow.

Step S508 checks whether the current mode is the area magnification mode or linear magnification mode. When it is the former, the pilot lamp 108*a* is turned on in step S509, the pilot lamp 108*b* is turned off in step S510, and the square root of the displayed value is displayed in step S511. When the current mode is the linear magnification mode, the pilot lamp 108*a* is turned off in step S512, the lamp 108*b* is turned on in step S513, and the square of the value on display is shown in step S514.

Thus, when the display change key 108 is depressed while a linear magnification is shown on the display 72 in the linear magnification mode, the corresponding area magnification is shown on the display 72 while the key is held depressed, whereas the display of the original linear magnification is resumed when the key is released. On the other hand, when the display change key 108 is depressed with an area magnification on the display 72 in the area magnification mode, the corresponding linear magnification is given on the display 72 during depression, and the original area magnification is shown again when the key is released.

According to the control mode described above, the display change key 108 functions only when the display 72 shows a magnification, but the arrangement may be so adapted that even when no magnification is shown on the display 72, the magnification in the current magnification mode is shown in response to the depression of the change key 108, followed by the display of a value of the other magnification mode converted from the displayed value upon lapse of a given period of time, and further followed by the display of the value of original mode upon lapse of a period of time or upon release of the key 108.

With the copying machine of the present invention described, copy magnifications can be set or selected in terms of linear magnification, as well as of area magnification, so that copy images can be edited with extreme ease. The linear magnification set can be displayed as an area magnification, while the area magnification set can be displayed as a linear magnification. This permits the user to readily understand the correlation between the linear and area magnifications. Moreover, the magnification setting procedure is simple. The present invention therefore has outstanding advantages.

What is claimed is:

1. A copying machine for producing copies of variable magnification comprising:

means for inputting arbitrary numerical values;

means for alternatively selecting a linear magnification mode wherein the numerical value is handled as a linear magnification and an area magnification mode wherein the numerical value is handled as an area magnification;

lower limit means for changing the input numerical value to a first lower limited value when the input numerical value is smaller than the first lower limited value in the linear magnification mode, and for changing the input numerical value to a first upper limited value when the input numerical value is smaller than the second lower limited value in the area magnification mode;

upper limit means for changing the input numerical value to a first upper limited value when the input numerical value is larger than the first upper limited value in the linear magnification mode, and for changing the input numerical value to a second upper limited value when the input numerical value is larger than the second upper limited value in the area magnification mode;

means for storing the input numerical value or the changed numerical value, and means for producing copies on the magnification corresponding to the stored numerical value.

2. A copying machine as claimed in claim 1, wherein said second lower limited value is the square of said first lower limited value.

3. A copying machine as claimed in claim 1, wherein said second upper limited value is the square of said first upper limited value.

4. A copying machine as claimed in claim 1, further comprises means for displaying the input numerical value and the stored numerical value.

5. A copying machine for producing copies of variable magnification comprising:

means for inputting arbitrary numerical values;

means for alternatively selecting a linear magnification mode wherein the numerical value is handled as a linear magnification and an area magnification mode wherein the numerical value is handled as an area magnification, and means for limiting the range of the numerical values input by said input means in accordance with the selected magnification modes.

6. A copying machine for producing copies with variable magnification, comprising:

means for inputting arbitrary numerical values;

means for alternatively selecting a linear magnification mode wherein the numerical value is processed as a linear magnification and an area magnification mode wherein the numerical value is processed as an area magnification;

lower limit means for changing the input numerical value to a first lower limited value when the input numerical value is smaller than the first lower limited value in the linear magnification mode, and for changing the input numerical value to a first upper limited value when the input numerical value is smaller than the first lower limited value in the area magnification mode;

upper limit means changing the input numerical value to a first upper limited value when the input numerical value is larger than the first upper limited value in the linear magnification mode, and for changing the input numerical value to a second upper limited value when the input numerical value is larger than the second upper limited value in the area magnification mode;

means for displaying either the input numerical value or the changed numerical value; and means for producing copies having the magnification displayed by said display means.

7. A copying machine as claimed in claim 6, wherein said second lower limited value is the square of said first lower limited value.

8. A copying machine as claimed in claim 6, wherein said second upper limited value is the square of said first upper limited value.

9. A copying machine as claimed in claim 6, further comprising means for storing the input numerical value or the changed numerical value.

* * * * *

UNITED STATES PATENT AND TRADEMARK OFFICE

CERTIFICATE OF CORRECTION

PATENT NO. : 4,768,066

DATED : August 30, 1988

INVENTOR(S) : Masazumi Ito

It is certified that error appears in the above-identified patent and that said Letters Patent is hereby corrected as shown below:

Column 11, line 29, Claim 1, delete "first upper" and insert --second lower--.

Column 12, line 27, Claim 6, delete "first upper" and insert --second lower--.

Column 12, line 29, Claim 6, delete "first" and insert --second--.

Signed and Sealed this

Eighteenth Day of April, 1989

*Attest:*

DONALD J. QUIGG

*Attesting Officer*

*Commissioner of Patents and Trademarks*